United States Patent [19]

Shaughnessy et al.

[11] 4,137,971
[45] Feb. 6, 1979

[54] METHOD OF CONSOLIDATING A SUBTERRANEAN FORMATION

[75] Inventors: Christopher M. Shaughnessy; William M. Salathiel, both of Houston, Tex.

[73] Assignee: Exxon Production Research Company, Houston, Tex.

[21] Appl. No.: 878,631

[22] Filed: Feb. 17, 1978

Related U.S. Application Data

[63] Continuation of Ser. No. 814,009, Jul. 8, 1977, abandoned.

[51] Int. Cl.² .................... E21B 21/00; E21B 43/00
[52] U.S. Cl. ................................... 166/295; 166/312
[58] Field of Search ............... 166/295, 276, 281, 285, 166/291, 292, 293, 294, 312

[56] References Cited

U.S. PATENT DOCUMENTS

| 3,055,426 | 9/1962 | Kerver et al. | 166/293 |
|---|---|---|---|
| 3,090,435 | 5/1963 | Kerver et al. | 166/293 |
| 3,123,138 | 3/1964 | Robichaux | 166/295 |
| 3,199,590 | 8/1965 | Young et al. | 166/295 |
| 3,250,330 | 5/1966 | Smith, Jr. | 166/295 |
| 3,339,633 | 9/1967 | Richardson | 166/295 |
| 3,384,176 | 5/1968 | Huitt | 166/285 X |
| 3,552,493 | 1/1971 | Bezemer | 166/295 |
| 3,718,189 | 2/1973 | Terry | 166/295 X |
| 3,759,327 | 9/1973 | Carnes | 166/295 |
| 3,902,557 | 9/1975 | Shaughnessy et al. | 166/295 |
| 3,915,232 | 10/1975 | Gruesbeck et al. | 166/295 |

OTHER PUBLICATIONS

Hong, K. C. et al., "Injection Profile Effects Due to Gravity Segregation in the Wellbore", SPE Paper No. 6129, Society of Petroleum Engineers of AIME, Copyright 1976.
Richardson, E. A. et al., "Consolidation of Silty Sands with an Epoxy Resin Overflush Process", Sep. 1970, *Journal of Petroleum Technology*, pp. 1103-1108.

Primary Examiner—Stephen J. Novosad
Attorney, Agent, or Firm—Michael A. Nametz; Gary D/. Lawson

[57] ABSTRACT

A method of preventing the failure of a sand consolidation treatment due to contamination of the resinous material with aqueous rathole fluids during injection is described. The method involves displacing the aqueous rathole fluids with a dense, nonaqueous liquid prior to introducing the resinous material into the formation.

16 Claims, 1 Drawing Figure

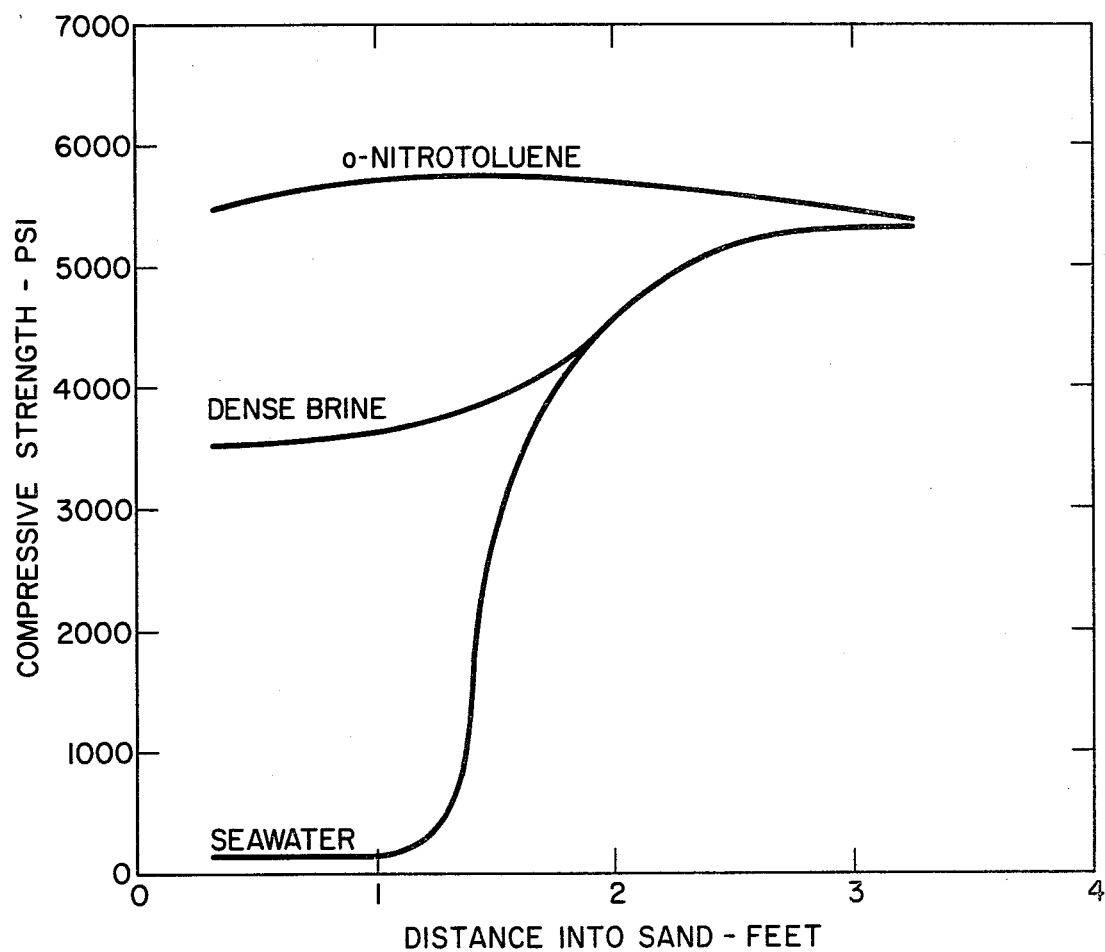

METHOD OF CONSOLIDATING A SUBTERRANEAN FORMATION

This application is a continuation of application Ser. No. 814,009, filed July 8, 1977, now abandoned.

BACKGROUND OF THE INVENTION

1. Field of the Invention

The present invention relates to an improved method for treating subterranean, unconsolidated formation. In one aspect it relates to an improved method for preconditioning the wellbore prior to consolidating the formation with synthetic resins.

2. Description of the Prior Art

Difficulties due to solids entrained in produced fluids have led to sand control methods which employ a variety of different synthetic resins for the consolidation of incompetent subterranean formations. These methods involve the injection of a liquid resin or a resin forming material into the formation and permitting the resin to cure to an infusible state, thereby bonding the formation sand in place. Typically, a solvent is injected as a preflush into the formation to remove resident fluids and precondition the formation to be consolidated.

Often, the consolidation treatment is unsuccessful because of contamination of the resin during injection by fluids contained in the wellbore. These contaminating fluids often exist in the casing rathole (i.e. that portion of the casing below a perforated zone adjacent the unconsolidated formation). Typical contaminating fluids include water-base completion fluids, seawater, and formation brine remaining from a well completion or workover operation.

During sand consolidation treatments, the resin being injected into the formation can displace a considerable amount of aqueous rathole contaminating fluid into the formation. This results in a continuous contamination of the resin during injection, resulting in poor consolidation. Moreover, a significant amount of resin accumulates in the rathole and is wasted.

A prior technique for dealing wth the problem of contaminating fluid in the rathole involves circulating a high density brine into the rathole, resulting in a rathole fluid which the resin will not displace. There are several problems with this method. In order to rapidly and efficiently place the high density brine in the well, a pipe which extends to the bottom of the rathole is necessary so that filling can take place from the bottom upwards. This necessitates the use of a workover rig and increases costs. Another disadvantage is the incompatibility of some consolidating fluids with the dense brine. Further, experience has shown that simply mixing the dense brine for filling the rathole is an error-prone process. Finally, even if a high density brine is located in the rathole, contamination of the resin solution still takes place during injection which can cause failure of the consolidation treatment.

SUMMARY OF THE INVENTION

The present invention provides an improved method of displacing unwanted rathole fluids. Briefly, the method involves pumping a dense nonaqueous liquid into a cased wellbore to the level of the rathole fluid, followed by injection of a preflush solution and a sand consolidating resin into the formation. The dense nonaqueous fluid immiscibly displaces the aqueous rathole fluids which are removed from the formation in the vicinity of the wellbore by the subsequent injection of the preflush solution. This effectively prevents contamination of the resin when consolidating the formation.

The nonaqueous fluid is characterized by certain properties. First, the displacing fluid must have a density which is greater than the aqueous rathole fluid and also greater than any of the subsequent consolidating fluids. Second, the displacing fluid should be immiscible with the aqueous rathole fluid. Third, the displacing fluid should be miscible with the consolidating preflush solution, if a preflush solution is used in the consolidation treatment.

In a preferred embodiment, the viscosity of the displacing fluid must be such that a practical filling rate can be achieved and such that removal of excess displacing fluid from the formation pore spaces is facilitated. Also, the use of halogenated hydrocarbons is not preferred since such compounds, if produced together with other fluids, would tend to cause difficulties at a later refining stage.

The present invention is described in detail below with particular emphasis on the epoxy resin systems. However, it should be observed that the principles exemplified by the invention are equally applicable to other systems that employ a resinous material in the consolidation of incompetent subterranean formations, and which are sensitive to the presence of aqueous rathole fluids.

BRIEF DESCRIPTION OF THE DRAWING

The drawing is a plot comparing the compressive strength of a consolidated formation as a function of radial distance from the wellbore for various rathole fluids.

DESCRIPTION OF THE PREFERRED EMBODIMENTS

Briefly, a plastic consolidation treatment of an incompetent formation using an epoxy resin system catalyzed in situ involves the sequential introduction into the selected formation of a preflush solution, a liquid resin solution and a solution containing a curing agent or catalyst. The curing agent or catalyst, upon contacting the resin, initiates and accelerates polymerization, causing a rigid, permeable sheath to be formed around the wellbore. The preflush solution is utilized for a variety of purposes in the pretreatmeant of the formation, including removal of connate water to improve compressive strengths, preparation of the formation sand grains to improve bonding and removal of local formation impairment.

The present invention involves the introduction of a dense, nonaqueous fluid into the wellbore prior to injecting other consolidation treatment solutions in order to displace aqueous fluids remaining in the wellbore after previous well operations. These aqueous fluids are generally contained in a lower portion of the wellbore below the interval over which communication between the wellbore and the formation has been established by casing perforations or otherwise. This lower portion is commonly referred to as a rathole. While the following discussion assumes that communication between the wellbore and formation has been established by perforating the casing over a selected interval, it should be understood that other techniques may have been employed for this purpose, such as milling to remove a portion of the casing. The practice of the method of the present invention does not depend on the method of establishing communication between the wellbore and the formation. It is sufficient that an opening has been established, using any suitable method, permitting communication.

A typical source of the rathole fluids is the formation itself, i.e. formation brine fills the rathole. Another source of aqueous rathole fluid is from previous efforts to wash produced sand from the wellbore. Usually, the unconsolidated formation has produced some sand into the wellbore which must be washed out to some depth below the bottom perforation. Common washing fluids include salt water and brine, a portion of which usually remains in the rathole after washing the sand from the wellbore. Finally, aqueous drilling fluids remaining from ordinary drilling operations, may still be present in the rathole, although this situation would not be common since the well has generally been circulated with a clean fluid such as brine prior to perforating and producing.

A dense nonaqueous liquid useful for displacing rathole fluids should be characterized by several properties. First, the displacing fluid should have a density greater than that of the rathole fluid or any of the subsequent consolidating fluids. This is so that once the aqueous rathole fluids are displaced, subsequent consolidating solutions will not in turn displace the nonaqueous displacing fluid. As a practical matter, the displacing fluid should have a minimum density of about 1.05 grams/cc and preferably a density of about 1.10 grams/cc or greater. Second, the displacing fluid should be immiscible with the aqueous rathole fluid. This eliminates the problem of mixing between the incoming dense fluids and rathole fluids, and permits efficient gravity displacement from the top downwards. As a practical matter, this means that an expensive workover rig is not needed in order to introduce the displacing fluid into the wellbore. The nonaqueous displacing fluid may be introduced simply by pumping the fluid into the casing at the surface, commonly referred to as a bullhead technique. Third, the displacing fluid should be miscible with the preflush solution, and preferably with the resin solution as well. This eliminates the problem of removing excess displacing fluid from the formation pore spaces. Any excess displacing fluid which enters the unconsolidated formation is removed from the formation in the vicinity of the wellbore, along with the displaced aqueous rathole fluids, by the normal quantities of preflush and resin solution.

Certain other practical considerations enter into the choice of a suitable nonaqueous displacing fluid. First, to facilitate pumping of the displacing fluids and also to facilitate removal of excess displacing fluid from the formation, a suitable fluid should have a viscosity of less than 100 centipoise at formation temperatures, and preferably less than about 20 centipoise. This viscosity is similar to that of most other consolidation fluids. Second, the displacing fluid should be compatible with standard oil field and refining practices. Because halogenated hydrocarbons are known to be harmful to many common refinery catalysts, the use of such compounds is not preferred.

Suitable nonaqueous displacing fluids that exhibit the above described properties include ortho-nitrotoluene, carbon disulfide, dimethylphthalate, nitrobenzene, and isoquinoline. Suitable fluids are not limited to these examples, however, so long as the nonaqueous fluid used possesses the necessary characteristics. Combinations of different non-aqueous fluids may also be utilized in practicing the method of the present invention.

In a typical application of the present invention, the displacing fluid is pumped directly into the casing at the wellhead. As mentioned previously, the portion of the wellbore from the perforations to the surface generally contains either an aqueous fluid, such as brine remaining from perforation operations, or produced fluids. This, when pumping operations are commenced, these fluids are forced into the formation. The aqueous rathole fluids, however, will remain in place until the dense non-aqueous fluid reaches the level of the lowest perforations. The dense fluid flows down to the formation perforations where diplacement of the aqueous rathole fluids takes place. Preferably, the displacing fluid is continuously pumped during the displacement process. This confines the displacement process to the rathole and also permits displacement to take place more rapidly, since the aqueous rathole fluids are dynamically forced into the formation through the perforations.

In the preferred method, displacement of the aqueous rathole fluids by the nonaqueous fluid is more than a simple gravity displacement wherein the density difference of the fluids provides the only driving force. The preferred displacement process may be considered a dynamic process since the displacement of the rathole fluid occurs as the nonaqueous fluid is continuously pumped at the surface; while a major portion of the nonaqueous fluid gravitates in the rathole to displace aqueous fluids, a portion flows into the formation, forcing the aqueous rathole fluids into the formation and confining the gravity displacement process to the rathole. Thus, after the nonaqueous displacing fluid has been pumped into the wellbore, the rathole will be completely filled with this fluid. The aqueous rathole fluids will have been displaced into the formation some distance. Further, any excess displacing fluid pumped becomes located in the formation immediately adjacent the wellbore and some radial distance outward (although perhaps not the total radial distance which will ultimately be consolidated, typically 3-4 feet).

The aqueous rathole fluids should be totally displaced since any aqueous fluids remaining in the rathole would merely float on the dense liquid, entering the formation incrementally when the resin or preflush were pumped. Thus, an excess of displacing fluid is normally used in order to provide a safety factor.

Typically, about 10 to about 12 barrels of nonaqueous displacing fluid are required to fill a typical rathole of about 50 feet. Generally, adequate displacement rates are achieved by pumping at standard rates, i.e. about one-half barrel per minute. Under these conditions, the rathole can be filled with the nonaqueous fluids and the aqueous rathole fluids displaced in about 20 minutes.

Once the dense nonaqueous fluid has been pumped and fills the rathole, a suitable preflush solution may be pumped into the casing at the wellhead. Since all water is now confined to the formation, injection of the preflush solution tends to displace all water (which would later contaminate the resin solution if left in place) radially outwardly from the formation volume to be consolidated. Moreover, by chosing a nonaqueous displacing fluid that is micible with the preflush solution, any excess dense nonaqueous fluid is similarly displaced outwardly during injection of the preflush solution.

Preferably, the preflush solution should have a density which is less than both the nonaqueous displacing and the aqueous rathole fluid. This facilitates displacement of both fluids by the preflush solution radially outwardly into the formation. However, this preferred characteristic is more important where gravity displacement of the aqueous fluid alone is utilized, as opposed to displacement under continuous pumping. Thus, if the dense nonaqueous fluid is simply pumped to the level of the formation perforations and allowed to displace the aqueous fluid with pumping stopped, the aqueous fluid will tend to remain in the wellbore above the rathole. Subsequent injection of a preflush solution having a density less than the aqueous fluid more effectively utilizes the density difference of the aqueous fluid and preflush solution during displacement, thereby minimizing the volume of preflush solution necessary to insure complete displacement of the aqueous fluid into the formation as desired. It can be noted that most common preflush solutions inherently possess the requisite density.

After injection of the preflush solution, a proper volume of resin solution is injected into the formation followed by the curing agent or catalyst dissolved in a suitable solvent. Normally, from about 50 to about 75 gallons of resin solution per foot of interval to be treated are used.

Since the nonaqueous fluid filling the rathole has a density greater than that of the resin solution, waste of the resin solution is limited to the small amount which may be located between the lower perforations and the top of the displacing fluids in the rathole. This amount will be significantly less than the amount lost when the resin solution is able to displace the rathole fluid. For example, the amount lost in the rathole when aqueous fluids are not displaced may be as much as 50 gallons.

Injection of the solution containing the curing agent or catalyst displaces the resin from the pore spaces of the formation and imparts the desired permeability to the invaded pore spaces. The curing agent or catalyst is extracted by the resin solution that remains in contact with the sand grains. This causes the resin to harden, bonding the sand grains together to consolidate the formation.

On the rare occasion where drilling mud remains in the rathole, the greatest problem arises due to the separation of mud solids and water. A quantity of water may exist over a relatively short interval in the rathole immediately below the bottom perforation (the exact distance of the interval will be dependent on mud composition, length of time in rathole and temperature). Generally, the drilling fluid suspension has a much greater composite density than any of the consolidating chemicals and therefore displacement normally would seem to be unnecessary. However, tests have shown that even a small amount of aqueous fluids below the perforations, if not removed, can cause failure of the consolidation treatment. The method of the present invention effectively removes such aqueous fluids, with the only modification being a reduction in the volume of nonaqueous displacing fluid pumped into the wellbore.

Further details of an in situ cured epoxy treatment are described in an article entitled "Externally Catalyzed Epoxy for Sand Control" by F. A. Brooks, et al., published in *Journal of Petroleum Technology*, June 1974.

Although the present invention has been described in relation to an in situ cured method for placing epoxy resins, other methods of placement and types of plastic consolidation treatments made be used. Thus, the epoxy resins may be applied by an internally cured method wherein a solution of the resin along with the curing agent or catalyst is injected into the formation. One such method is described at length in an article entitled "Consolidation of Silty Sands With An Epoxy Resin Overflush Process", by E. H. Richardson and T. W. Hamby, published in *Journal of Petroleum Technology*, September, 1970. Also, the placement of the various liquids may be accomplished by means of a workstring extending through the cased wellbore. Such methods and types of material will be familiar to those skilled in the art.

As described in detail in the references noted above, the consolidation treatments, in addition to the preflush solution, resin solution and overflush liquids, may employ other liquids such as preacidizing treatment solutions, spacer liquids, and the like. Additives for the various solutions may include coupling agents, thickening agents, surfactants, and the like.

LABORATORY EXPERIMENTS

In order to demonstrate the effect of the treatment according to the present invention on the compressive strength and retained permeability of a consolidated interval, several consolidated samples were prepared and subjected to compressive strength and permeability tests. A large scale radial well bore model was constructed for performing the consolidation experiments. The model was triangular in shape, representing a 70° sector about a well, and had a radius of 5 feet and a thickness of 1 foot. Damp Brazos River sand was used to pack the model. During consolidation studies, the model was brought to a temperature of about 150° F, representative of a typical formation temperature. Fluids were pumped into the triangular model at scaled field rates. A pipe section, simulating a wellbore and rathole, was located at one corner of the triangle, and extended below the model to provide a rathole of approximately 8 feet in length. A single perforation was provided in the pipe section communicating with the model formation.

Table 1 presents the experimental conditions for tests conducted to compare the effect different fluids filling the pipe section of the test model had on a typical epoxy sand consolidation treatment. Identical pumping rates, preflush, resin and catalyst solution volumes and concentrations, as well as identical consolidating materials were utilized in the tests. The rathole, however, was filled with several different fluids prior to pumping the consolidation chemicals in order to simulate the effect of different displacing fluids on the consolidation treatment.

Table 1

| EXPERIMENTAL CONDITIONS FOR RATHOLE FLUIDS TESTS | | | | |
|---|---|---|---|---|
| | Fluid in Rathole | | | |
| | Low Density Brine | Dense Brine | Nitrotoluene | Seawater |
| Pump Rate (bbl/min) | 0.50 | 0.50 | 0.50 | 0.50 |
| Preflush Volume (gal/ft) | 80 | 80 | 80 | 80 |
| Resin Volume (gal/ft) | 55 | 55 | 55 | 55 |
| Spacer Oil Volume (gal/ft) | 40 | 30 | 30 | 30 |
| Catalyst Solution Volume (gal/ft) | 250 | 250 | 250 | 250 |
| Initial Permeability (Darcy) | 2.20 | 1.31 | 1.20 | 2.00 |
| Consolidated | | | | |

Table 1-continued

EXPERIMENTAL CONDITIONS FOR RATHOLE FLUIDS TESTS

| | Fluid in Rathole | | | |
|---|---|---|---|---|
| | Low Density Brine | Dense Brine | Nitrotoluene | Seawater |
| Radius (inches) | 43 | 43 | 35 | 41 |
| Avg. Porosity | | | | |
| Initial | 42.3 | 40.4 | 42.0 | 39.6 |
| Final | 28.3 | 26.5 | 27.6 | 25.8 |

After consolidation, the formation was tested for compressive strength and retained permeability. The results of these tests are reported in Table 2.

Table 2

EFFECT OF RATHOLE FLUID ON CONSOLIDATION TREATMENT

| Rathole Fluid During Consolidation | Composite Permeability Retention (%) | Average Strength (psi) |
|---|---|---|
| Low density brine | 79% | 4940 |
| Dense brine | 100%+ | 4880 |
| Seawater | 100%+ | 3310 |
| Nitrotoluene | 95% | 5910 |

When sea water (8.5 pounds per gallon) filled the rathole, the more dense resin (9.0 pounds per gallon) incrementally displaced the sea water into the sand pack. As seen in the drawing, the displaced sea water invaded the sand pack to a depth of about 16 inches and prevented the epoxy resin from adhering to the sand. The low compressive strength in the formation 0 to 16 inches from the wellbore would probably lead to an initial job failure, if obtained in a field application.

When dense brine (9.8 pounds per gallon) filled the rathole, the resin solution tended to displace brine from about 3 inches of rathole directly below the perforation, perhaps due to turbulence around the perforation. As seen in the drawing, this again resulted in a relatively poor strength profile for the sand pack, reflecting the small amount of water displaced.

Superior results were obtained when the rathole was filled with o-nitrotoluene (9.6 pounds per gallon). Because the wellbore did not contain any water throughout the time of resin injection, maximum strength was maintained throughout the entire sand pack, as seen in the drawing. The average compressive strength of the sand pack was also much higher, as reported in Table 2.

Again, it should be observed that the method of the present invention may also be used with an internally-cured epxoy system, and with other resin materials. It should be realized that the specific materials and procedures may differ somewhat from those described herein. However, the principle exemplified by displacement of aqueous rathole fluids with a nonaqueous fluid having the requisite physical characteristics is equally applicable to such other systems.

FIELD TEST

The following field test illustrates a specific procedure for performing the method of the present invention. A well completed in an 8 foot interval at about 8,900 feet was not capable of sustanining production for long periods of time because of sand problems. A 1-inch work string was placed in the well and brine circulated therethrough to remove sand from the wellbore. An slurry of 10-15 mesh sand and brine was injected through the perforations and pressure packed in place. Diesel oil was then used to displace brine above the lowermost perforations. Following an injectivity test to insure that the perforations were open, pumping operations were commenced. The pumping schedule was as follows:

| | Quantity | Tradename or Type | Supplier |
|---|---|---|---|
| Acid Solution | | | |
| 15% HCl | 300 gal | 15% HCl | — |
| Mud Acid | 750 gal | 3% HF-12% HCl | — |
| Neutralizer | 1000 gal | $H_2O$, $NH_4Cl$, $NH_4HCO_3$ | — |
| Nonaqueous Displacing Fluid | | | |
| Nitrotoluene | 300 gal | o-nitrotoluene | DuPont |
| Preflush Solvent | | | |
| Ethylene glycol/ isopropyl ether | 800 gal | Solvent AC | Union Carbide |
| Thickening agent | 32 lb | PVP(K-90) | GAF Corp. |
| Coupling agent | 4 gal | Z-6020 | Dow Corning |
| Resin Solution | | | |
| Epoxy resin | 293 gal | XD-7818 | Dow Chemical |
| Acetone/Cyclohexane | 149 gal | — | — |
| Spacer Fluid | | | |
| Refined Oil | 160 gal. | Mentor 28 | Exxon Co., USA |
| Refined Oil | 80 gal | Flexon 766 | Exxon Co., USA |
| Catalyst Solution | | | |
| Refined Oil | 1340 gal | Mentor 28 | Exxon Co., USA |
| Refined Oil | 660 gal | Flexon 766 | Exxon Co., USA |
| Catalyst (tertiary amine) | 60 gal | DMP-30 | Rohm and Haas |

The various liquids were injected through the work string and into the formation in the above sequence at a rate of about 20 gallons per minute. The final solution was displaced from the workover string with diesel oil and the well was shut in to permit the resin to cure. When the well was returned to production, produced fluids were sand free indicating initial success of the treatment.

The laboratory tests and actual field test described above, respectively demonstrate the benefits and applicability of the method of the present invention in said consolidation treatments.

We claim:

1. A method of consolidating an incompetent subterranean formation surrounding a cased wellbore wherein the casing has an intermediate perforated interval opposite said formation which comprises;
   (a) pumping a nonaqueous fluid down said wellbore to displace substantially all of the fluid in said casing below said perforated interval and to force the displaced well fluid into said formation, said nonaqueous fluid having a density greater than said well fluid;
   (b) pumping a preflush solution having a density less than said nonaqueous fluid down said wellbore and into said formation;
   (c) pumping a resinous material having a density less than said nonaqueous fluid down said wellbore and into said formation; and
   (d) allowing said resinous material to harden thereby consolidating a portion of said formation.

2. The method of claim 1 wherein said nonaqueous fluid has a density of greater than about 1.05 g/cc.

3. The method of claim 2 wherein said nonaqueous fluid has a density of greater than about 1.10 g/cc.

4. The method of claim 3 wherein said nonaqueous fluid is substantially free of halogens.

5. The method of claim 1 wherein said nonaqueous fluid is miscible with said preflush solution, and immiscible with the fluids contained in said wellbore below said interval.

6. The method of claim 5 wherein said nonaqueous liquid is miscible with said solution containing resinous material.

7. The method of claim 1 wherein said nonaqueous liquid includes a liquid selected from the group consisting of o-nitrotoluene, carbon disulfide, dimethylphthalate, nitrobenzene, and isoquinoline.

8. The method as defined in claim 1 wherein the steps of pumping said nonaqueous fluid, said preflush solution, and said resinous material is performed through said casing.

9. In a method for the consolidation of an incompetent subterranean formation surrounding a cased wellbore having an opening therein providing fluid communication between said wellbore and said formation wherein a resinous material is injected into the formation and allowed to harden, said wellbore containing an aqueous, resin-contaminating fluid in a portion of said wellbore below the level of said opening, the improvement which comprises, prior to injecting said resinous material, immiscibly displacing said contaminating fluid from said portion with a nonaqueous fluid which has a density greater than the density of said contaminating fluid and said resinous material to force said resin-contaminating fluid into said formation, thereafter injecting a preflush fluid into said formation which is partially miscible with both the aqueous contaminating fluid and the nonaqueous fluid.

10. The method of claim 9 wherein said nonaqueous fluid is miscible with said resinous material.

11. The method of claim 9 wherein said nonaqueous fluid has a viscosity of less than about 100 centipoise.

12. The method of claim 11 wherein the viscosity of said nonaqueous liquid is less than about 20 centipoise.

13. The method of claim 9 wherein said nonaqueous fluid is substantially free of halogenated material.

14. A method of consolidating an incompetent formation surrounding a cased wellbore having a perforated interval opposite said formation and containing an aqueous fluid in a lower portion thereof which comprises:

(a) forcing substantially all of the aqueous fluid from said lower portion of said wellbore and into said formation by introducing a nonaqueous fluid into said wellbore, said nonaqueous fluid being immiscible with said aqueous fluid and having a density greater than said aqueous fluid;

(b) further displacing said aqueous fluid radially outwardly into said formation by pumping a preflush solution into said formation, said preflush solution being at least partially miscible with both said aqueous fluid and said nonaqueous fluid and having a density less than said nonaqueous fluid;

(c) pumping into said formation a resin solution which is miscible with said nonaqueous fluid and has a density less than said nonaqueous fluid; and (d) permitting said resin to harden such that said formation is consolidated.

15. The method of claim 14 wherein said resin solution contains an epoxy resin.

16. The method of claim 14 wherein said nonaqueous fluid includes a fluid selected from the group consisting of o-nitrotoluene, carbon disulfide, dimethylphthalate, nitrobenzene, and isoquinoline.

* * * * *